United States Patent [19]

Collin

[11] 4,384,639
[45] * May 24, 1983

[54] TWO-WAY POWER TRANSFERRING REDUCTION GEAR OF THE EPICYCLIC TYPE

[75] Inventor: Lars T. Collin, Mölndal, Sweden

[73] Assignee: Lars Collin Consult AB, Molndal, Sweden

[*] Notice: The portion of the term of this patent subsequent to Jun. 9, 1998, has been disclaimed.

[21] Appl. No.: 238,113

[22] Filed: Feb. 25, 1981

Related U.S. Application Data

[63] Continuation of Ser. No. 39,665, May 16, 1979, Pat. No. 4,271,940, which is a continuation of Ser. No. 829,536, Aug. 31, 1977, abandoned, which is a continuation-in-part of Ser. No. 667,341, Mar. 16, 1976, Pat. No. 4,051,679, which is a continuation of Ser. No. 595,228, Jul. 11, 1975, abandoned, which is a continuation of Ser. No. 1,442,845, Dec. 17, 1973, abandoned.

[30] Foreign Application Priority Data

Dec. 8, 1972 [SE] Sweden ............................... 16003/72

[51] Int. Cl.³ ...................... B63H 23/08; F16D 67/00
[52] U.S. Cl. .................................. 192/4 C; 192/0.094
[58] Field of Search ............ 192/4 C, 4 B, 0.9, 0.094; 74/758

[56] References Cited

U.S. PATENT DOCUMENTS

| | | | |
|---|---|---|---|
| 2,648,998 | 8/1953 | Stoeckicht | 74/758 |
| 3,363,732 | 1/1968 | Nakamura et al. | 192/4 C |
| 3,744,241 | 7/1973 | Muller et al. | 192/4 B |
| 4,051,679 | 10/1977 | Collin | 192/4 C |
| 4,271,940 | 6/1981 | Collin | 192/4 C |

Primary Examiner—Kenneth Downey
Attorney, Agent, or Firm—Holman & Stern

[57] ABSTRACT

A reversing/reduction gear connecting a marine gas turbine to a propulsion shaft is of the epicyclic type, and includes two sun wheels, two sets of planetary gear wheels, two planetary gear wheel carriers and two external ring wheels, means being provided for selectively braking a first combination of one planetary gear wheel carrier and one of the external gear wheels, as well as the combination of the other external ring wheel and one of the sun wheels, respectively.

5 Claims, 3 Drawing Figures

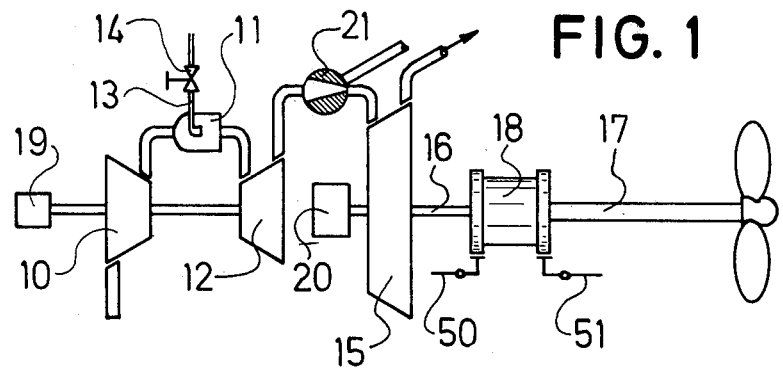
FIG. 1
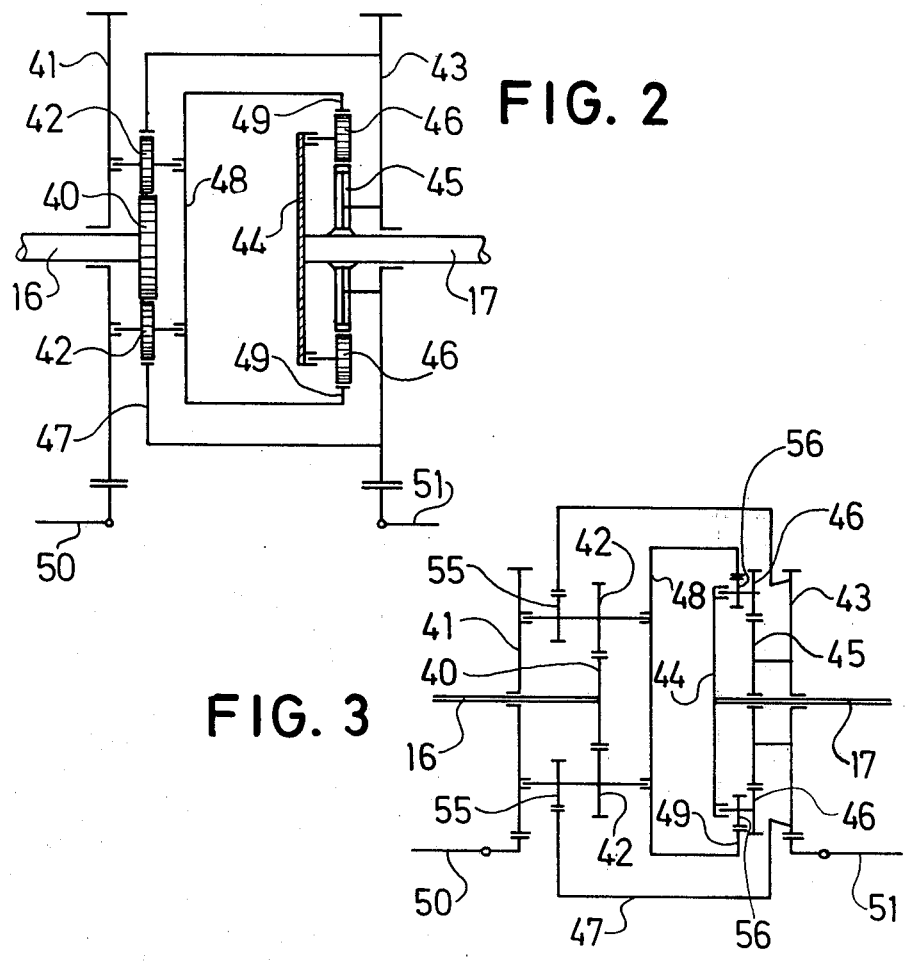
FIG. 2
FIG. 3

TWO-WAY POWER TRANSFERRING REDUCTION GEAR OF THE EPICYCLIC TYPE

This is a continuation of application Ser. No. 039,665, filed May 16, 1979, now U.S. Pat. No. 4,271,940, which in turn is a continuation of Ser. No. 829,536, filed Aug. 31, 1977, now abandoned, which in turn is a continuation-in-part of Ser. No. 667,341, filed Mar. 16, 1976, now U.S. Pat. No. 4,051,679, which in turn is a continuation of Ser. No. 595,228, filed July 11, 1975, now abandoned, which in turn is a continuation of Ser. No. 1,442,845, filed Dec. 17, 1973, now abandoned.

BACKGROUND OF THE INVENTION

When designing high output marine propulsion machineries, the reversing has hitherto been a limiting factor. Certain engine types of prime movers are designed to be directly reversible so they can supply the required output in both directions of rotation. Other machineries, as for instance turbines, do not possess such properties, while, with a third type, reversing is possible, constructional and operational complications make it more convenient to reverse by other means than the power unit itself.

Many gears with reversing facilities are very expensive, and have, for that reason, mainly been installed in warships. With steam turbines, the reversing problem has been solved by providing separate astern-turbines. Reversible gears have been proposed, in which the torque is transferred to different combinations of gears by means of hydraulic clutches being filled and emptied, and in turn connecting the machinery to the propeller via different gearways.

It has also been proposed, during a reversing operation, to reduce the torque acting upon the gear to about zero, by means of brakes mounted at the propeller shaft. As long as the ship is moving through the water, the propeller must also be braked which imposes a heavy load upon the brake.

SUMMARY OF THE INVENTION

The present invention relates to marine propulsion plants, in which the prime mover is a gas turbine, and which includes a reversing gear comprising a first part mechanically connected to the turbine and a second part connected to the propeller shaft, as well as means to maintain said parts in either of two different working conditions, for ahead and astern running, respectively. The plant is provided with means to govern the flow of motive fluid to the turbine, as well as means for braking the turbine and the part of the reversing gear connected thereto. The turbine rotor is carried in bearings permitting the rotation thereof in two different directions, and there are means at the reversing gear permitting transfer of torque the usual way from the turbine to the propeller shaft, but also in the opposite direction.

The parts of the reversing gear are designed in such a manner, that the turbine rotor and the gear part connected thereto will, in use, represent a considerably smaller inertia than the propeller shaft and the rotatable elements connected thereto, which means that it will be comparatively easy to brake the turbine after removing the supply of motive fluid thereto, and then to re-engage the gear parts. The turbine will then be forced to rotate "backwards" by the inertia of the propeller shaft, but the latter will first be braked and then brought to rotate in the new direction, when motive fluid is reapplied to the turbine.

The reversing/reduction gear is of the epicyclic type and includes the conventional components of sun wheel, planetary gear wheels, a carrier for the latter and an external ring wheels, two such sets of components being provided. The gear further includes first braking means for selectively determining the rotation of a first combination of one planetary gear wheel carrier and one external gear wheel, as well as second braking means for selectively determining the rotation of a combination of the other external ring wheel and one sun wheel.

BRIEF DESCRIPTION OF THE DRAWINGS

FIG. 1 shows schematically a marine propulsion plant including a gas turbine and a reversing/reduction gear, FIG. 2 shows, on a larger scale, the design of a reversing/reduction gear, FIG. 3 shows a further embodiment of the reversing/reduction gear.

BRIEF DESCRIPTION OF THE PREFERRED EMBODIMENTS

The marine propulsion plant illustrated in FIG. 1 comprises a gas generating portion including a compessor 10, a combustion chamber 11 and a first turbine 12 driving the compressor. The combustion chamber is provided with a burner 13 having means 14 for governing the supply of fuel. A main, or propulsion turbine is denoted by 15. The output shaft 16 of the main turbine 15 is connected to the propeller shaft 17 by means of a reversible epicyclic gear 18, to be described in detail herebelow in connection with FIG. 2. A motor for starting the gas generating unit is denoted by 19.

Means for aiding in the braking of the main turbine 15 is indicated at 20 and may be of arbitrary known type.

Certain types of gas generator units cannot be completely shut down during reversing, but must continue to generate some amount of gas. In order to prevent motive fluid being supplied to the main turbine 15 during the braking step, a bleed-off valve 21 is provided, by means of which any desired amount of motive fluid may be made to by-pass the main turbine.

The main steps involved in a reversing operation are as follows: First of all, the supply of motive fluid to the turbine is cut off, and thereafter the driving connection at the reversing gear is disengaged. The movement of the ship through the water will continue, and the propeller will, acting as a water turbine, drive the propeller shaft and the part of the gear mechanically connected thereto in the same direction as before.

The inertia of the turbine and the part of the gear mechanically connected thereto will also make these parts continue to rotate in the same direction as before, but no, or only an insignificant amount of power is supplied thereto, so the speed will be rapidly reduced.

The brake 20 is then applied and the turbine motor is brought to stand still, or almost so.

It will now be possible gradually to engage the reversing gear. The propeller shaft system is still rotating in the original direction, and an engagement will bring the turbine part of the gear to rotate "backwards". This imposes a load on the propeller shaft, which reduces its tendency to rotate.

Thereafter motive fluid is supplied to the turbine, which now rotates contrary to its normal working direction. The action of the motive fluid upon the rotor buckets will first fully brake the now interconnected system from the turbine to the propeller, and finally bring this to rotate in the new (normal working) direction of rotation.

For large outputs, the so called epicyclic gear has proven very useful, as it provides a high degree of reduction with comparatively small space requirements. Such a gear is schematically shown in FIG. 2.

A first sun wheel 40 is mounted upon the turbine output (power transfer) shaft 16 and a first rim wheel 41 is rotatably mounted thereon. This rim wheel carries a first set of planetary gear wheels 42, meshing with the first sun wheel 40.

A second rim wheel 43 is rotatably mounted upon the propeller shaft 17 at the inner end of which a planetary carrier 44 is fitted. The second rim wheel 43 is provided with an internal gear ring 45 serving as a second sun wheel for a second set of planetary wheels 46 carried by the planetary carrier 44, as well as with an internal gear ring 47 cooperating with the first set of planetary gear wheels 42. An internal gear wheel 48, having an internal gear rim 49 for cooperation with the second set of planetary gear wheels 46, is carried by the first rim wheel 41 by means of the shafts of the first set of planetary gear wheels 42.

Either of the two rim wheels 41,43 may be kept stationary by means of first and second locking devices 50 and 51, respectively. These may be of any well known type, but are here preferably also designed in such a manner that they may exert a braking effect upon the pertaining rim wheel.

It is evident that when both locking devices are released, the turbine and the propeller shaft lack any torque transferring connection.

The function of the gear is as follows. Suppose first that first rim wheel 41 is locked. The rotation of first sun wheel 40 is then, by way of the first planetary gear wheels 42, transferred to the second rim wheel 43 by way of its internal gear ring 47. The rotation of the second rim wheel 43 is transferred to the propeller (second power transfer) shaft 17 by way of the external gear ring (second sun wheel) 45 thereon, the second planetary gear wheels 46 and the planetary carrier 44 with the internal gear wheel 48 being kept stationary by the first rim wheel 41.

If, instead the second rim wheel 43 is locked, the power is transferred from the first sun wheel 40 by way of the first planetary gear wheels 42 to the internal gear wheel 48, internal gear ring 47 being stationary. The internal gear wheel 48 directly cooperates with the second set of planetary gear wheels 46, and as also the external gear ring (second sun wheel) 45 is stationary, the torque is transferred directly to the planetary carrier 44.

The reduction ratio is, in a conventional manner, determined by selection of the diameters of the various wheels. A way of further increasing the possibilities of selecting the exchange ratios is shown in FIG. 3, where internal gear wheel 48 and second rims (ring) rum wheel 43 do not engage directly with the planetary gear wheels, but with pinions mounted upon the same shafts as said gear wheels.

In FIG. 3 the same reference numerals as in FIG. 2 are employed, whenever applicable.

A first pinion 35 is fixedly mounted upon the shaft of each first planetary gear wheel 42, and the internal gear rim of second rim (ring) wheel 43 is adapted for cooperation with these pinions.

Second pinions 36 are fixedly mounted upon the shafts carrying the second planetary gear wheels 46, and the internal gear rim 49 of internal gear wheel 48 is adapted for cooperation with these further pinions.

Otherwise this gear operates in the same manner as that of FIG. 2.

Reversing gears of above described types have noted advantages with respect to the requirements for space. With respect to the braking properties, it is, as above mentioned, of importance that the part of the gear connected to the turbine be as small as possible.

As the gear shall be able to transfer torque both ways, it is evident that first sun wheel 40 could be mounted upon the propeller shaft, and the planetary gear wheel carrier 44 be mounted upon the turbine output shaft, the position of the further components then being correspondingly shifted.

I claim:

1. A propulsion unit comprising in combination a gas turbine prime mover having a gasifier portion, a power turbine rotatable independently of said gasifier portion, a conduit for supplying gas from said gasifier portion to said power turbine, bearings for mounting said power turbine and permitting rotation thereof in opposite directions and means for braking the rotor of said power turbine to a standstill, a driven member, a two-way reversible reduction gear train of the epicyclic type for transferring power between said prime mover and said driven member, said gear train comprising first and second sun wheels, first and second planetary gear wheels, first and second planetary gear wheel carriers, and first and second external ring gears, a first power transfer shaft connecting said power turbine with said first sun wheel, a second power transfer shaft connecting said second sun wheel with said driven member, said first planetary gear wheel carrier being mounted for rotation together with said second external ring gear, said first external ring gear being mounted for rotation together with said second sun wheel, first braking means for selectively determining the rotation of said first planetary gear wheel carrier and said second external ring gear, and second braking means for selectively determining the rotation of said first external ring gear and said second sun wheel.

2. A propulsion unit comprising in combination a gas turbine prime mover having a gasifier portion, a power turbine rotatable independently of said gasifier portion, a conduit for supplying gas from said gasifier portion to said power turbine, bearings for mounting said power turbine and permitting rotation thereof in opposite directions and means for braking the rotor of said power turbine to a standstill, a driven member, a two-way reversible reduction gear train of the epicyclic type for transferring power between said prime mover and said driven member, said gear train comprising first and second sun wheels, first and second planetary gear wheels, first and second planetary gear wheel carriers, and first and second external ring gears, a first power transfer shaft connecting said power turbine with said first sun wheel, a second power transfer shaft connecting said second sun wheel with said driven member, said first planetary gear wheel being mounted for rotation together with said second external ring gear, said first external ring gear being mounted for rotation together with said second sun wheel, first braking means for selectively determining the rotation of said first planetary gear wheel carrier and said second external ring gear, second braking means for selectively determining the rotation of said first external ring gear and said second sun wheel, and disengaging means between said power turbine and a part of said reversible reduction gear located so that said power transfer shaft and as small a part of the reversible gear as possible may be disengaged and permitted to approach a standstill position before being reengaged after the turbine is reversed.

3. A reversible drive propulsion unit comprising in combination a reversably rotatable gas power turbine prime mover, means for variably supplying said turbine with motor fluid, a driven member, and two-way reversible epicyclic reduction gear train means having separate drive connections with the turbine and with the driven member for transferring power between the prime mover and the driven member whereby the turbine and the driven member may rotate in the same or in the opposite direction, disengaging means between said power turbine and a part of said reversible reduction gear means located so that said drive connection from said turbine and as small a part as possible of the reversible gear may be disengaged and permitted to approach a standstill position before being re-engaged after said turbine is reversed, and means for braking the rotor of said power turbine.

4. The propulsion unit of claim 2 or 3 further comprising a by-pass in the conduit for supplying gas from said gasifier portion to said power turbine, and means for opening said by-pass while said brake is applied and for closing said by-pass after release of said brake from the stationary turbine rotor.

5. A propulsion unit comprising in combination a gas turbine prime mover having a gasifier portion, a power turbine (15) rotatable independently of said gasifier portion to said power turbine, bearings for mounting said power turbine and permitting rotation thereof in opposite directions and means for braking the rotor of said power turbine to a standstill, a first power transfer shaft (16) between said power turbine (15) and an epicyclic two-way reversible reduction gear train (18) and a second power transfer shaft (17) between said gear train and a driven member, so as to permit transferring power between said power turbine and said driven member; said gear train comprising:

a first sun wheel (40) mounted upon the first power transfer shaft (16) and a first rim wheel (41) rotatably mounted on said shaft (16), said first rim wheel (41) carrying a first set of planetary gear wheels (42) meshing with the first sun wheel (40), a second rim wheel (43) is rotatably mounted on the second power transfer shaft (17), at the inner end of which a planetary carrier (44) is fitted, the second rim wheel (43) is provided with an internal gear ring (45) serving as a second sun wheel for a second set of planetary gear wheels (46) carried by the planetary carrier (44), the second rim wheel (43) also being provided with an internal gear ring (47) cooperating with the first set of planetary gear wheels (42), an internal gear wheel (48) having an internal gear rim (49) for cooperation with the second set of planetary gear wheels (46) is carried by the first rim wheel (41) by means of the shafts of the first set of planetary gear wheels (42), a first locking device (50) is provided which may keep the first rim wheel (41) stationary and a second locking device (51) is provided which may keep the second rim wheel (43) stationary;

so that when locking device (50) locks the first rim wheel (41), the rotation of the first sun wheel (40) is transferred by way of the first planetary gear wheels (42) to the second rim wheel (43) by way of its internal gear ring (47), the rotation of the second rim wheel (43) being transferred to the second power shaft (17) by way of the external gear ring (45), the second planetary gear wheels (46) and the planetary carrier (44) with the internal gear wheel (48) being kept stationary by the first rim wheel (41); and so that when locking device (51) locks the second rim wheel (43), the power is transferred from the first sun wheel (40) by way of the first planetary gear wheels (42) to the internal gear wheel (48) while the internal gear ring (47) is stationary, the internal gear wheel (48) directly cooperating with the second set of planetary gear wheels (46), the external gear ring (45) also remaining stationary, while torque is transferred directly to the planetary carrier (44) and to the second power shaft (17);

whereby said locking devices (50, 51) act as disengaging means between said power turbine and a part of said gear train wherein said first power transfer shaft (16) and as small a part of said gear train as possible may be disengaged and permitted to approach a standstill position before being reengaged after the turbine is reversed.

* * * * *